F. PARRY.
PROCESS FOR THE PROPAGATION OF FISH.
APPLICATION FILED MAY 2, 1910.
1,023,590.
Patented Apr. 16, 1912.
4 SHEETS—SHEET 1.
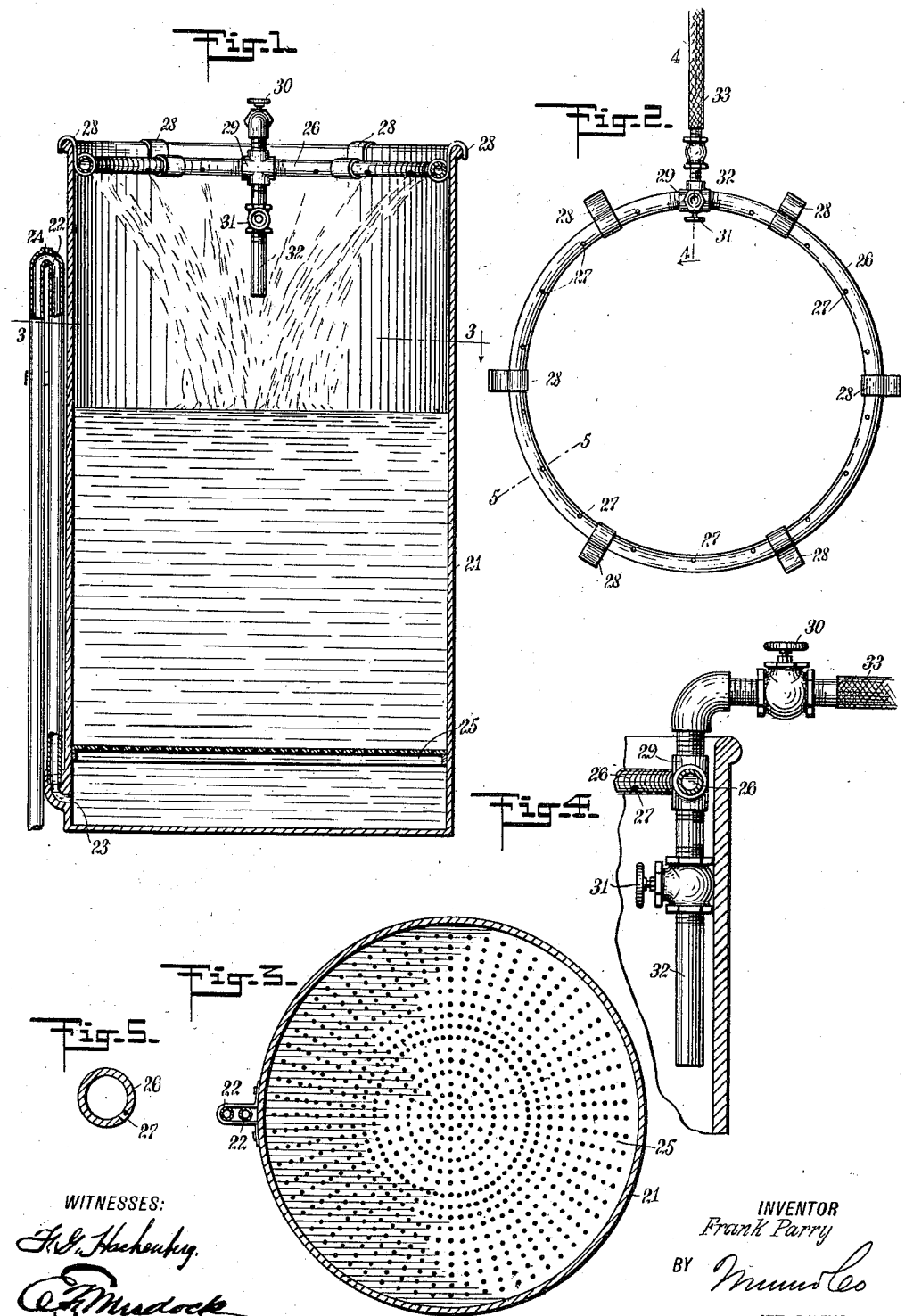

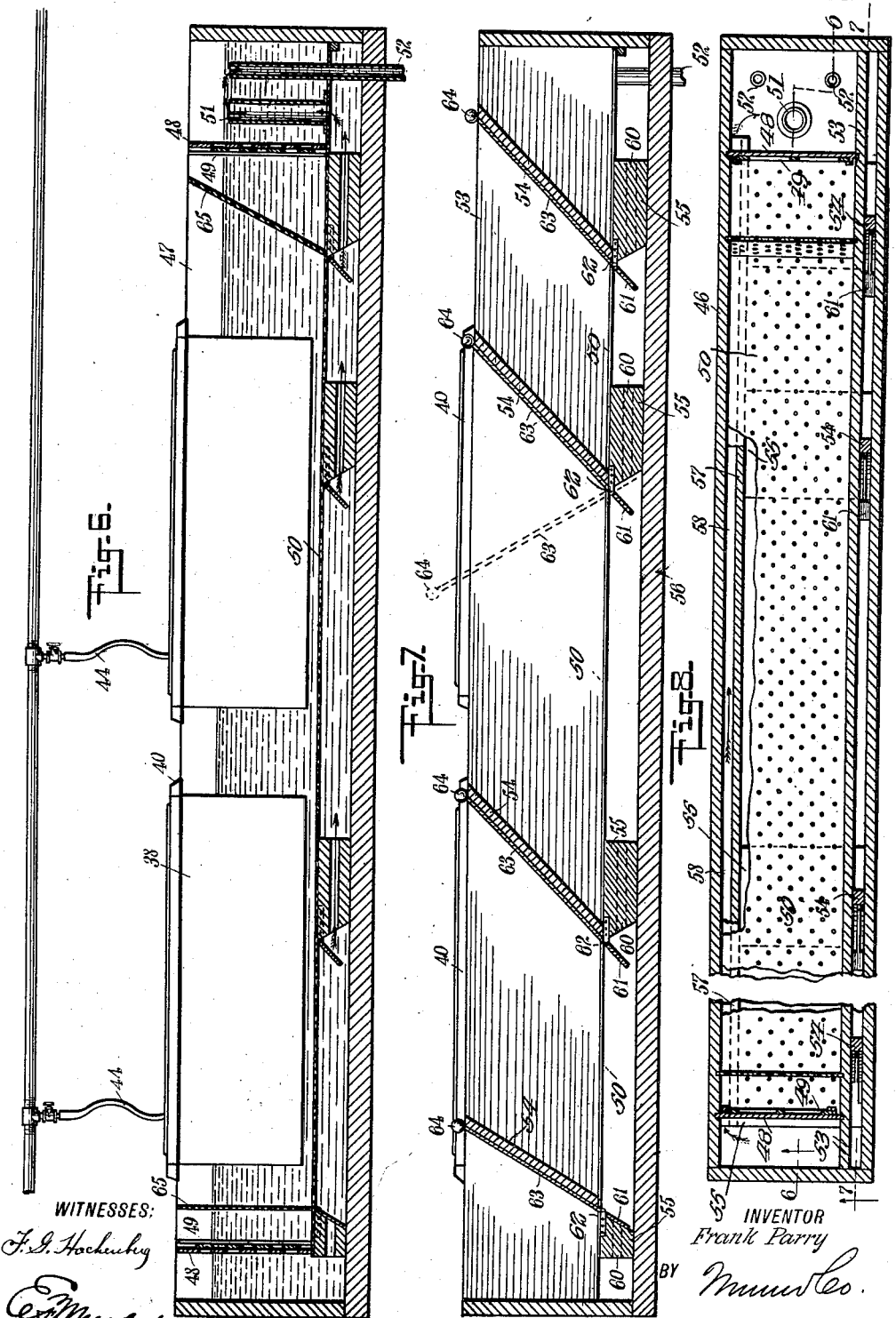

F. PARRY.
PROCESS FOR THE PROPAGATION OF FISH.
APPLICATION FILED MAY 2, 1910.
1,023,590.
Patented Apr. 16, 1912.
4 SHEETS—SHEET 3.
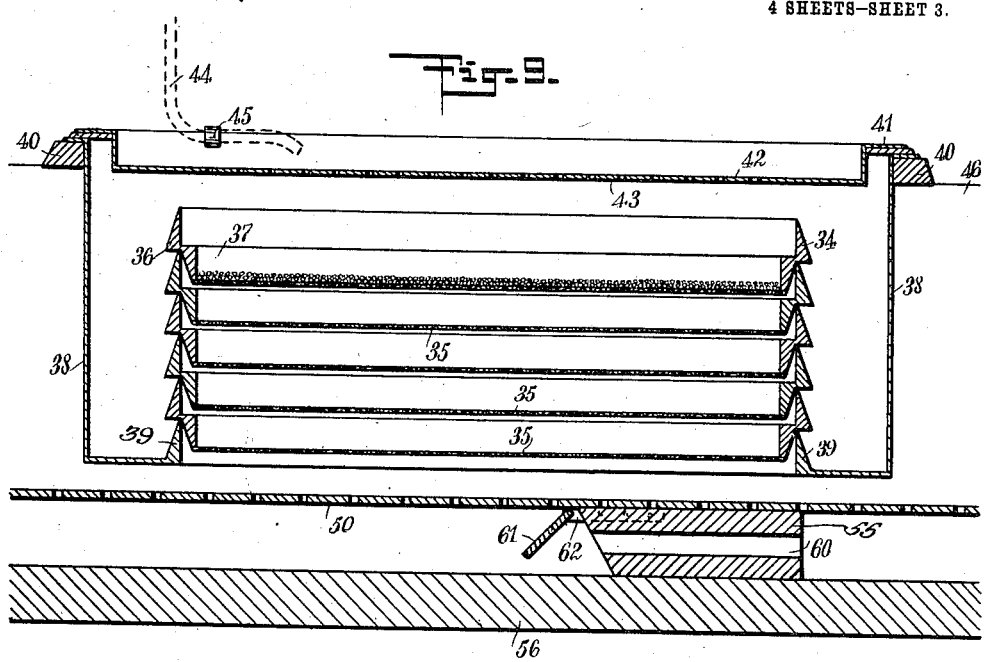
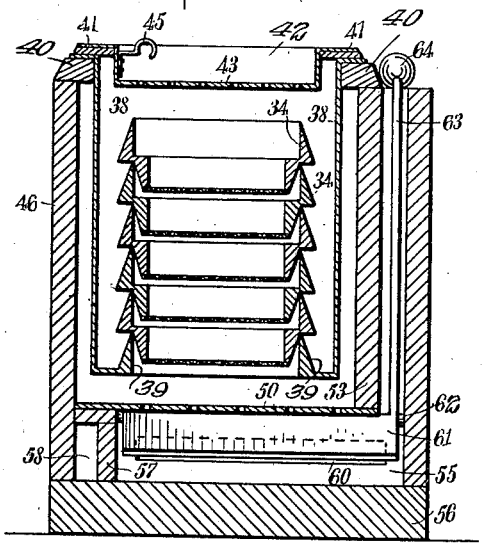
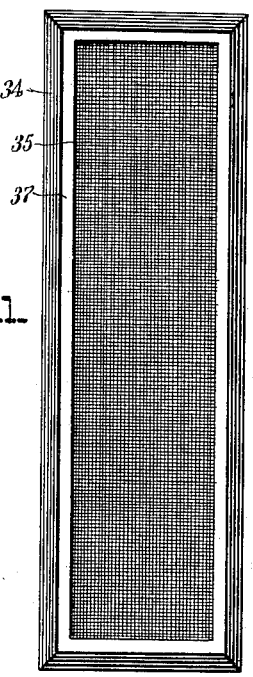
WITNESSES:
INVENTOR
Frank Parry
BY
ATTORNEYS F. PARRY.
PROCESS FOR THE PROPAGATION OF FISH.
APPLICATION FILED MAY 2, 1910.
1,023,590.
Patented Apr. 16, 1912.
4 SHEETS—SHEET 4.
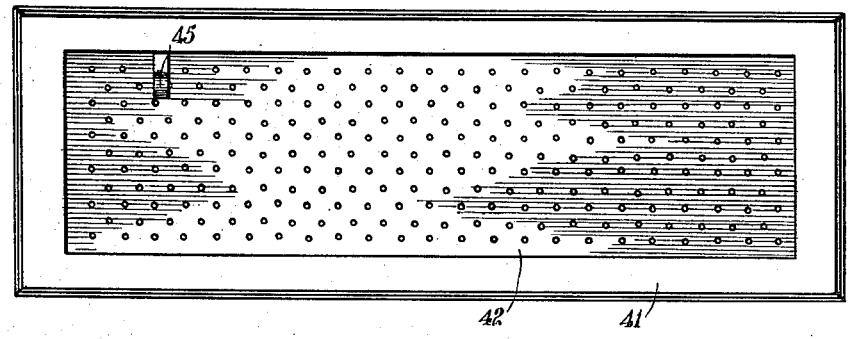
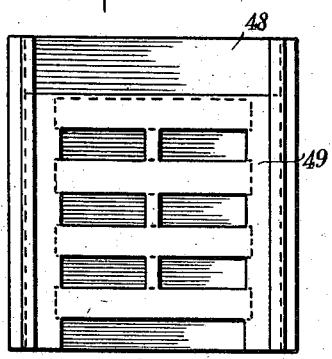
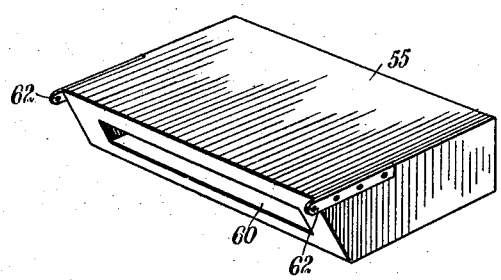
WITNESSES:
INVENTOR
Frank Parry
BY
ATTORNEYS

UNITED STATES PATENT OFFICE.

FRANK PARRY, OF BRIGHTWATER, BRITISH COLUMBIA, CANADA.

PROCESS FOR THE PROPAGATION OF FISH.

1,023,590.  Specification of Letters Patent.  Patented Apr. 16, 1912.

Application filed May 2, 1910. Serial No. 559,031.

*To all whom it may concern:*

Be it known that I, FRANK PARRY, a subject of the King of Great Britain, and a resident of Brightwater, in the Province of British Columbia, Dominion of Canada, have invented a new and Improved Process for the Propagation of Fish, of which the following is a full, clear, and exact description.

Among the principal objects which the present invention has in view are: To provide a system for impregnating and incubating fish ova and for preserving the "fry" by subjecting the same during incubation to the action of water flowing in an upward and downward direction alternately; to provide a system for the incubation of fish ova wherein the parasitic growths to which they are at present subjected is prevented.

One embodiment of a mechanism for employing the present invention is disclosed in the structure illustrated in the accompanying drawings, in which like characters of reference denote corresponding parts in all the views, and in which—

Figure 1 is a vertical cross section of a spawning pan constructed and arranged in accordance with the present invention; Fig. 2 is a plan view in detail, of a spraying ring adapted to be used in conjunction with the spawning pan; Fig. 3 is a cross section of the spawning pan taken on the line 3—3 in Fig. 1; Fig. 4 is a detail view on an enlarged scale of the filling nozzle for the spawning pan; Fig. 5 is a cross section, on an enlarged scale, of the spraying pipe, the section being taken on the line 5—5 in Fig. 2; Fig. 6 is a longitudinal vertical section of an incubating trough, taken on the line 6—6 in Fig. 8, showing in conjunction therewith two incubator baskets employed in the present invention; Fig. 7 is a vertical longitudinal section of the incubating trough taken on the line 7—7 in Fig. 8; Fig. 8 is a longitudinal horizontal section of the incubating trough constructed and arranged in accordance with the present invention; Fig. 9 is a longitudinal vertical section of an incubating basket constructed and arranged in accordance with this invention, shown in conjunction with a fragment of the incubating trough, also shown in section and on an enlarged scale; Fig. 10 is a cross section on an enlarged scale, of the incubating trough and of the incubating basket as mounted and arranged therein; Fig. 11 is a detail view in plan and on an enlarged scale, showing an egg tray; Fig. 12 is a detail view on an enlarged scale of the aerating tray; Fig. 13 is a detail view on an enlarged scale, and in side elevation, of the tide gate for controlling the flow of water in the incubating trough; Fig. 14 is a detail view in perspective of a water delivery gate employed to regulate the flow of water in the incubating trough.

Heretofore the method pursued for the incubation of fish has followed the general method of placing the impregnated ova on trays submerged in troughs wherein the water has been caused to flow in a gentle current. Many forms of control for the water thus flowing so as to circulate the same, have been devised. That most usual in practice has been the staggered relation of partitions, disposed in the manner of baffle plates, causing the water to follow a tortuous passage. However, the pans or trays have been so constructed and arranged that the water has been caused to flow around or under the body of the eggs, rather than through them.

The distinctive feature of the present invention is that the system and means employed herein compel the water to pass vertically through the body of eggs while contained upon the trays.

A further disadvantage in the present system of incubation which it is the object of the present invention to overcome, has been that the flow of water through the troughs has lifted the moving body thereof from the floor or bottom of the troughs, permitting the "fry" to smother or become devitalized for want of proper aeration.

A further advantage in the employment of the present system herein described is that, by reason of the absence of manual handling of the spawn and consequent crushing of a portion thereof, a larger percentage of yield is obtained.

The spawning bucket 21 is formed substantially as shown in Fig. 1 of the drawings, and is provided with an overflow pipe 22. The pipe 22 has an outlet passage 23, passing from the body of the bucket 21 and rising to a bend at the upper end where a perforation 24 is provided in the pipe 22. The perforation 24 prevents the formation of a siphon in the said pipe 22. The outlet of the pipe 22 may be carried to any point desired, provided the same gives sufficient fall to drain the said pipe. Above the outlet passage 23 the bucket is provided with a perforated bottom or tray 25, the perforations therein being sufficiently small to prevent the passage therethrough of the fish ova.

Water is introduced into the bucket 21 by means of a circular spraying pipe 26, the perforations 27 whereof are arranged in declined position to form a series of circumferentially disposed inwardly projected jets, converging toward the center and below the said pipe 26, as illustrated in Fig. 1 of the drawings. The pipe 26 is suspended by means of hangers 28, 28 upon the upper edge of the bucket 21, and is provided with a union 29 and valves 30, 31, the latter being formed on a nipple spout 32.

The water which is delivered to the bucket 21 through a pipe 33 is taken from a creek, or other body of water in which the fish being stripped have lived. In this manner there is prevented any sudden or great variation of temperature to which the eggs are subjected. This variation in temperature is a source of a large proportion of the destruction of the ova.

The operation of stripping the male and female fish when using the present system is the same as that usually employed in so far as the hand manipulation is concerned. By reason of the converged spray the fish may be partially submerged during the operation of stripping. When the milt is drawn from the male, the same is washed by the falling water into the water contained in the bucket 21, being carried therein by the spray from the perforations 27, passing to the bottom in a fine milky cloud. The female is then stripped, the ova passing down through the water and in contact with the milt, until they rest upon the bottom 25. The impregnation occurs as in other systems.

The admission of the water from the pipe 26 continuing, the overflow through the pipe 22 is maintained. By reason of the construction, however, whereby the water is carried above the overflow line and in a vertical path, the heavier ova is prevented from passing over by gravity, should same have passed the bottom 25. At the same time, the devitalized milt or parasitic and fungus formation, much lighter than the ova, are gradually carried over through the pipe 22, and are thus removed from contact with the now impregnated ova. After impregnation, or spawning, the eggs are removed and placed in the trays 34, 34, as shown in Figs. 9 to 11 inclusive, care being exercised to form only two layers of the said eggs. The trays 34 are provided with inwardly stepped and converged sides. Between the sides is stretched a wire netting 35, 35, the mesh whereof is sufficiently fine to support the eggs.

The trays shown in Figs. 9 to 11 inclusive are each provided with a shoulder 36, outwardly extended to receive the upper edge of the next lower tray when the trays are nested, as shown particularly in Figs. 9 and 10. To aid in the operation of nesting the trays 34, and to prevent adherence, the lower extensions 37 of the sides of the said trays are inwardly converged on the outer surface to fit within the upper edge of the upper section, or that forming the shoulder 36. In this manner it is arranged that all of the trays 34 are provided with bottoms of the same dimension, although the trays be nested one within the other, and a larger capacity is provided for holding trays within a trough of given dimension.

The trays 34, 34 are supported in the basket 38, which is provided with an upturned edge 39, resembling in shape the upper section of the sides of the trays 34, and forming a rest for the lowermost tray. The basket 38 is provided with solid side walls, and at the upper edge is secured to a rim 40. The rim 40 is extended sufficiently to rest on the upper edge of the sides of the incubating trough. When resting in the trough the trays 34 are not subjected to the current of the water in the trough except as the same may be introduced into the trough downwardly through the trays 34 and through the open bottom of the basket 38.

Fitted in each basket 38, and suspended from the rim 40 thereof by means of an overhanging edge 41, is a tray 42, having a perforated bottom 43 therein. The bottom 43 is provided with perforations sufficiently fine to prevent the passage of the slime and other objectionable matter therethrough. The tray 42 is provided as a cover for the basket 38, and to receive and spread the water received from the pipe 44 to break the fall thereof, and to aerate the same prior to its admission over the trays 34, 34, and the eggs contained therein, and to the body of the said basket 38. The pipe 44 is flexible, and is supported on the tray 42 by means of a metal loop 45.

The hatchery is provided with a series of troughs 46, 46. The troughs 46 are elongated and adapted to receive a series of the baskets 38, 38, the rims 40 thereof resting on the upper edge of the vertical sides 47 of the said troughs. At each end of the troughs there is provided a fixed partition 48, having horizontally disposed openings adapted to be covered by the slats of a cage 49. The cage 49, at each end, slides in grooves. Normally, the troughs are tilted slightly to cause a gentle current, moving toward the lower end thereof.

At the lower end of each trough there is provided an upright pipe 51 and an overflow pipe 52, the latter passing to the next series of troughs, or to a waste pound. The troughs 46 are divided longitudinally by a partition 53. The partition 53 is removed from the outer side of the trough by a series of inclined cleats 54, 54. The partition 53 rests upon transversely disposed blocks 55. The blocks 55 are secured to the bottoms 56 of the troughs, and between the outer sides thereof, and a partition 57, forming the side of a channel 58. Disposed above the channel 58, partition 57, and the blocks 55, is a perforated bottom 50 fastened to the inner trough formed by the said bottom, one of the sides of the main trough, and the partition 53.

It is in the inner trough that the baskets 38 are suspended. The cleats 54 are extended from the blocks 55 to form cutoffs for the space below the bottom 50. The blocks 55 are provided with channels 60, extending lengthwise therethrough. These channels are provided to permit the flow of water through the space below the bottom 50 lengthwise of the entire trough. To prevent the flow of the water through the channels 60, each block is provided with a gate 61, hinged thereto at 62, and to each gate is connected an operating rod 63, the weighted head 64 whereof rests upon the inclined cleats 54. It will be observed that whenever the operating rod 63 is drawn forward, as shown in dotted lines in Fig. 7, the channel 60 pertaining to any particular block is thereby closed, and the water compelled to rise above the bottom 50 of the inner trough, lifting any deposited sediment from the said bottom and the perforations therein, forming in this manner a riffle or cleaning race.

The operation, normally, is that the water flowing into the trough is delivered by the pipes 44 upon the aerating trays 42, to pass downward through the layers of eggs, and out from the various baskets 38 to the bottom 50 of the inner trough. From the inner trough the water passes through the perforations in the bottom 50 to the space below the said bottom, and is carried through the channels 60 to the upright pipe 51. The water rises in the pipe 51 until it overflows into the compartment at the end of the trough to which the said pipe is connected. The level of the water in the compartments at the ends of the trough may be independent of the level of the water in the main body of the trough, provided the gates 49, 49 be closed over the openings in the partitions 48. In the lowermost of the said compartments the level of the water is governed by the overflow pipe 52.

As the fish are hatched they are carried downward by the falling stream of water, passing out of the basket 38, and delivered into the inner trough above the bottom 50, the perforations in the said bottom preventing the passage of the "fry" below the said bottom 50.

The water in the trough is maintained fresh by constantly adding to the water therein, through the pipes 44, downward through the baskets 38 and the trays 34 disposed therein, the water overflowing normally at the pipe 52 at the end of the trough, and as shown in the drawings, at the right hand end thereof. The fry are prevented from leaving the trough to pass to the overflow pipe 52 by the screen 65 and the gate 49 on the partitions 48.

If at any time, on inspection, it be desired to deflect the current from the channel below the bottom 50, this may be done by closing any or all of the passages 60 by throwing the gates 61 to closing position. The water then traveling in the space below the bottom 50 will, at that point, be taken up or compelled to overflow upward through the section of the bottom 50 just preceding the said closed gate 61. In this manner it will be observed that the loading and accumulation of sediment is prevented upon the top of the bottom 50, and the smothering of the "fry" incident to the lack of supply, is thereby prevented.

At each end of the inner trough there are provided permanent screens 65, 65. The screens 65, 65 are provided to prevent the passage of the small fish outward through the overflow pipe 52.

If, for any reason, it is desired to obtain a greater depth of water in the trough, this may be accomplished by closing the channels 60 and the slots in the partitions 48, thereby preventing the exodus of the water from the troughs. The flow continuing through the pipes 44, and downward through the trays 34, the water is raised in the trough until it would, if unchecked, overflow the sides thereof. If it be desired, the gate 49 may be regulated to produce varied and different levels of water in the said trough.

The cleats 54, 54 are provided for the purpose of dividing the channels formed by the partitions 53 into closed sections for the admission of water therethrough. It sometimes is desired to admit the water into the trough so as to form an uplifting current. This is accomplished by placing the pipes 44, 44 in the small channel formed by the partitions 53, and between the said cleats 54. When now the end partitions 48, 48 are closed, and the channels 60, 60 stopped, it will be observed that the water passing into the trough must enter from below the bottom 50 and rise upward until permitted to overflow through the pipe 52 by the opening of the slots in the partitions 48, 48.

It will be observed from what has been described that the operator managing a hatchery of the character specified may control the flow of the water to any extent without removing the trays 34, or manually shaking the eggs on the said trays, which shaking has been demonstrated as injurious to the fish.

To prevent the flooding of the troughs when it is desired to raise the water therein upward through the bottom 50, and when to do this the gates 61, 61 and the lower end gate 49 are closed, there is provided the channel 58 which forms an open communication between the ends of the trough. A further action is produced by thus closing the gates 61, 61 and the lower end gate 49 in that the water is compelled to flow from the lower to the upper end of the said trough, it being drained therefrom by the said channel 58. It will thus be observed that by a careful and intelligent handling of the gates 61, 61 and 49, 49, and by the introduction of the water from the pipes 44, 44, through the aerated trays 42, 42, or through the channels formed by the partition 53 and the cleats 54, the water in the trough may be induced to flow in varied directions.

Having thus described my invention, what I claim as new and desire to secure by Letters Patent is:—

A process for the propagation of fish consisting in alternately stripping the female and male fish while held in a falling stream of water.

In testimony whereof I have signed this specification in the presence of two subscribing witnesses.

FRANK PARRY.

Witnesses:
W. J. SIM,
D. J. SMITH.